US012657728B2

(12) United States Patent
Park et al.

(10) Patent No.: US 12,657,728 B2
(45) Date of Patent: Jun. 16, 2026

(54) METHOD FOR EXTRACTING REGION OF INTEREST BASED ON DRIVABLE REGION OF HIGH-RESOLUTION CAMERA

(71) Applicant: Korea Electronics Technology Institute, Seongnam-si (KR)

(72) Inventors: Jin Man Park, Gwangju-si (KR); Haeng Seon Son, Seongnam-si (KR); Kyoung Won Min, Seongnam-si (KR); Seon Young Lee, Seoul (KR); Young Bo Shim, Seongnam-si (KR); Gi Ho Sung, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 237 days.

(21) Appl. No.: 18/530,706

(22) Filed: Dec. 6, 2023

(65) Prior Publication Data

US 2024/0193783 A1      Jun. 13, 2024

(30) Foreign Application Priority Data

Dec. 8, 2022    (KR) ........................ 10-2022-0170197

(51) Int. Cl.
*G06T 7/11* (2017.01)

(52) U.S. Cl.
CPC ...... *G06T 7/11* (2017.01); *G06T 2207/10028* (2013.01)

(58) Field of Classification Search
CPC ... G06T 7/11; G06T 2207/10028; G06T 7/13; G06T 7/55; G06T 7/73; G06T 17/05
See application file for complete search history.

(56) References Cited

U.S. PATENT DOCUMENTS

2020/0124430 A1* 4/2020 Bradlow ................ B62J 45/412
2020/0250975 A1* 8/2020 Tang ........................ B62J 99/00

FOREIGN PATENT DOCUMENTS

KR        10-2030040 B1    10/2019

OTHER PUBLICATIONS

Korean Office Action issued on Sep. 22, 2025, in corresponding Korean Patent Application No. 10-2022-0170197. (3 pages in English, 5 pages in Korean).

* cited by examiner

*Primary Examiner* — Kent Yip
(74) *Attorney, Agent, or Firm* — NSIP Law

(57) ABSTRACT

There are a method and a system for extracting a region of interest in an image obtained through a high-resolution camera installed in an autonomous vehicle. The method for extracting the region of interest based on a drivable region in the high-resolution camera includes a step of acquiring an image through the high-resolution camera; and a step of extracting, by a processor, a region of interest within the acquired image by using 3D drivable region information. Accordingly, far-distance information extraction performance may be enhanced, and all of the functions of a set of a wide angle camera and a narrow angle camera of HD may be performed only with one FHD or UHD wide angle camera, so that the number of sensors may be reduced and a production cost may be reduced.

20 Claims, 11 Drawing Sheets 3D visualization. Rainbow color: Point group data generated by converting LiDAR and map of FIG. 3B, White color: Point group data generated by converting map of FIG. 3C Input image (Resolution: FHD)

Result of depth estimation after
downsizing to HD resolution

Result of depth estimation after
cropping region of interest of front
(Resolution: QVGA)

Input image (Resolution: FHD)

Result of depth estimation after
downsizing to HD resolution

Result of depth estimation after
cropping region of interest of front
(Resolution: QVGA)

100M distance

0M 3D visualization. Rainbow color: Point group data generated by converting LiDAR and map of FIG. 2B, White color: Point group data generated by converting map of FIG. 2C Input image (Resolution: FHD)

Result of depth estimation after
downsizing to HD resolution

Result of depth estimation after
cropping region of interest of
front (Resolution: QVGA)

3D visualization. Rainbow color: Point group data generated by converting LiDAR and map of FIG. 3B, White color: Point group data generated by converting map of FIG. 3C

110 ~

120 ~

130 ~

Algorithm 1: Search region of interest

Input: Feature point map $S'$,   Horizontal length of region of interest $W'$, Center point initial value of region of interest $c_0$ ( $W'/2 < c_0 < W_o - W'/2$ ).

Output: Center point of region of interest $c$ ( $W'/2 < c < W_o - W'/2$ )

Parameter initialization:

Residual $r = 0$,   iteration index $i = 0$,   max number of iteration $i_{max} = 10$,   learning rate $l = 0.01$ Search region of interest:

While ( $i < i_{max}$ ) do:

$$g \leftarrow \frac{1}{W'} \sum_{j=s_0+r-W'/2}^{s_0+r+W'/2-1} S_j$$

$\nabla r \leftarrow gradient(-g)$ $r \leftarrow -l \times \nabla r + r$ $i \leftarrow i+1$ $c \leftarrow c_i - 1$ $c \leftarrow c_{i-1}$ return $c$

FIG. 6

METHOD FOR EXTRACTING REGION OF INTEREST BASED ON DRIVABLE REGION OF HIGH-RESOLUTION CAMERA

CROSS-REFERENCE TO RELATED APPLICATION(S) AND CLAIM OF PRIORITY

This application is based on and claims priority under 35 U.S.C. § 119 to Korean Patent Application No. 10-2022-0170197, filed on Dec. 8, 2022, in the Korean Intellectual Property Office, the disclosure of which is herein incorporated by reference in its entirety.

BACKGROUND

Field

The disclosure relates to a method and a system for processing images in an autonomous vehicle, and more particularly, to a method and a system for extracting a region of interest from an image acquired through a high-resolution camera installed in an autonomous vehicle.

Description of Related Art

In the field of autonomous driving, there has been an attempt to use high-resolution cameras in order to acquire more detailed information of a more distant environment. However, as a resolution of an image increases, the time required to infer by a neural network substantially increases in proportion to an area, and to this end, resolutions of cameras currently used in the field of autonomous driving are mainly limited to video graphics array (VGA) (640×480) and high definition (HD) (1280×720).

In addition, when a high-resolution camera such as a full HD (FHD) (1920×1080) camera, an ultra HD (UHD) (3840×2160) camera is used, resolutions may be reduced to HD or a lower level mainly through downsizing in order to guarantee an inference speed of 30 Hz or higher. In this case, image quality may be degraded and there may be a problem that environmental information is considerably damaged.

In order to avoid downsizing while using a high-resolution camera, a method of defining a part of a front region as a region of interest and applying inference of a neural network only to the region of interest may be used.

FIGS. 1A to 1C are views provided to explain the influence of downsizing and region-of-interest extraction methods on results of estimating depth regarding a depth estimation problem. In FIG. 1B, shapes of cars (cars parked on the right side of the road) at far distance are not detected on a depth estimation result map due to downsizing. On the other hand, as shown in FIG. 1C, when depth estimation is performed after only a region of interest (a QVGA (320×240) region at the center of the image) is extracted, shapes of cars at far distance are detected.

In extracting a region of interest in a related-art method, a region of interest is fixed (for example, within 00 pixels on upper, lower, left or right sides from the center point of an image), and this involves the assumption that a front side is the most important.

However, in practice, both side directions of an image may be more important than a front side, and in this case, there may be a problem that a selected region of interest does not have important information.

FIGS. 2A to 2D are views provided to explain a problem arising in a related-art technology of extracting a fixed region of interest. As shown in FIG. 2A, when a car travels on a road curved to the left, a distant lane appears on the left side rather than the center point of an image. Accordingly, in order to detect objects on the distant lane, a region of interest needs to be shifted to the left side rather than the center point of the image.

However, the related-art method of extracting a fixed region of interest does not have this function, and accordingly, there is a problem that an outside portion of a lane which is less important is extracted as shown in FIG. 2C.

SUMMARY

The disclosure has been developed in order to solve the above-described problems, and an object of the disclosure is to provide a method and a system for extracting a region of interest based on a drivable region in a high-resolution camera, which set, as a region of an interest, a region that is a drivable region and also is farthest from a camera, by using three-dimensional (3D) drivable region information in an image acquired through a high-resolution camera installed in an autonomous vehicle.

According to an embodiment of the disclosure to achieve the above-described object, a method for extracting a region of interest based on a drivable region in a high-resolution camera may include: a step of acquiring an image through the high-resolution camera; and a step of extracting, by a processor, a region of interest within the acquired image by using 3D drivable region information.

In addition, the step of extracting the region of interest within the image may include: a far-distance point group extraction step of generating a far-distance point group (G') by extracting only points corresponding to a predetermined condition with respect to all points (x, y, z) of partial point group data (G), the partial point group data being constituted by extracting only points corresponding to a bottom through binary classification for each point in 3D point group data acquired by a LiDAR or a pseudo LiDAR installed in a vehicle; an image projection step of projecting all points (x, y, z) of the far-distance point group (G') to 2D original image pixels (u, v); a dimension reduction step of generating an 1D feature point map ($S \in \mathbb{R}^{1 \times W_o}$) by adding a pixel value to a vertical axis; a weighting calibration step of acquiring a new feature point map (S') in which a weighting is calibrated by multiplying the feature point map (S) by the Gaussian distribution; a region-of-interest search step of searching a peripheral region with reference to a predetermined region-of-interest center point initial value by using a region-of-interest search algorithm; and a region-of-interest extraction (crop) step of generating a region-of-interest image by extracting a region that satisfies a predetermined condition from an input image.

In addition, the far-distance point group extraction step may include generating the far-distance point group (G'$\in \mathbb{R}^{M \times 3}$) by extracting only points satisfying $d_{min} < z < d_{max}$ with respect to all points (x, y, z) of the partial point group data (G), and $d_{min}$ and $d_{max}$ may refer to a minimum distance value ($d_{min}$) and a maximum distance value ($d_{max}$) in a forward direction of the camera, respectively.

In addition, the image projection step may include, when all points (x, y, z) of the far-distance point group (G') are projected to the 2D original image pixels (u, v) by using an image projection equation ($[u, v, 1]^T = K \times [R|T] \times [x, y, z, 1]^T$), generating a binary image ($P \in \mathbb{R}^{H_o \times W_o}$) by representing pixels to which specific points of the far-distance point group (G') are projected by 1, and representing pixels to which specific points of the far-distance point (G') are not projected by 0, and $H_o$ may refer to a number of vertical pixels of the original image, and $W_o$ refers to a number of horizontal pixels of the original image.

In addition, the 1D feature point map ($S \in \mathbb{R}^{1 \times W_o}$) may have a larger value as more far-distance drivable region points are included.

In addition, on the new feature point map (S') in which the weighting is calibrated, the weighting may be applied to a $W_{o/2}$-th pixel which is an image horizontal center point when an average of the Gaussian distribution is $W_{o/2}$ and a standard deviation is $\sigma^2$, so that, when a region of interest is searched, the probability of selecting the image horizontal center point increases, and the proximity of the image horizontal center point may be selected unless an obstacle is positioned close to the image horizontal center point.

In addition, the region-of-interest search step may include searching a peripheral region with reference to a region-of-interest center point initial value C0 a predetermined number of times, the peripheral region searched with reference to the region-of-interest center point initial value may have a vertical size of H', a horizontal size of W', and a center point horizontal coordinate of C, and the center point horizontal coordinate C may be used as a region-of-interest center point initial value C0 when a region of interest is searched in a next frame.

In addition, the region-of-interest extraction step may include generating a region-of-interest image by extracting a region that satisfies a predetermined first condition and a predetermined second condition, and the predetermined first condition is $c - W'/2 < x < c + W'/2$, and the predetermined second condition is $H_o/2 - H'/2 < y < H_o/2 + H'/2$, where $H_o$ is a number of vertical pixels of the original image, W' is a horizontal size of the searched peripheral region, H' is a vertical size of the searched peripheral region, C is a center point horizontal coordinate, and (x, y) is pixel coordinates of an input image.

According to the present embodiment, the method may further include a step of generating, by the processor, a near-distance point group and a far-distance point group based on the extracted region of interest.

According to another embodiment of the disclosure, a system for extracting a region of interest based on a drivable region in a high-resolution camera may include: a high-resolution camera; and a processor configured to extract a region of interest within an image acquired through the high-resolution camera by using 3D drivable region information.

In addition, according to still another embodiment of the disclosure, a method for extracting a region of interest based on a drivable region in a high-resolution camera may include: a step of extracting, by a first processor, a region of interest within an image by using 3D drivable region information; and a step of generating, by a second processor, a near-distance point group and a far-distance point group based on the extracted region of interest.

In addition, according to yet another embodiment, a system for extracting a region of interest based on a drivable region in a high-resolution camera may include: a first processor configured to extract a region of interest within an image by using 3D drivable region information; and a second processor configured to generate a near-distance point group and a far-distance point group based on the extracted region of interest.

According to embodiments of the disclosure as described above, by extracting a region that is a drivable region and is also farthest from a camera, as a region of interest, by using 3D drivable region information in an image obtained by a high-resolution camera installed in an autonomous vehicle, far-distance information extraction performance may be enhanced, and all of the functions of a set of a wide angle camera and a narrow angle camera of HD may be performed only with one FHD or UHD wide angle camera, so that the number of sensors may be reduced and a production cost may be reduced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 is a view provided to explain a region-of-interest search algorithm according to an embodiment of the disclosure.

DETAILED DESCRIPTION

Hereinafter, the disclosure will be described in more detail with reference to the accompanying drawings.

A related-art region-of-interest extracting technology extracts only a center region of an image as a region of interest regardless of a shape of a driving road. However, a region of interest extracted in the related-art method may be inappropriate to a road with a small radius of rotation such as a curved lane, a lane turning to the left.

A system for extracting a region of interest based on a drivable region in a high-resolution camera (hereinafter, referred to as a "region-of-interest extraction system") according to an embodiment of the disclosure may extract a region in which a distant object needs to be detected adaptively in extracting a region of interest by reflecting a shape of a driving lane adaptively, and recognizes an object in the extracted region of interest without downsizing, so that distant object information extraction performance may be enhanced compared to related-art technologies.

To achieve this, the region-of-interest extraction system according to an embodiment may extract a region that is a drivable region and also is farthest from a camera as a region of interest by using 3D drivable region information in an image obtained by a high-resolution camera installed in an autonomous vehicle. In this case, the 3D drivable region information is presented in the form of a point group, and respective points in a point group correspond to a drivable ground surface.

In addition, most of the current autonomous vehicles have one or more of each of a wide angle camera and a narrow angle camera of HD level installed at a front portion. The wide angle camera serves to recognize an object at near distance/middle distance, and the narrow angle camera serves to recognize an object at middle distance/far distance.

However, since the region-of-interest extraction system performs all of the functions of the set of the HD-wide angle camera and narrow angle camera with one FHD or UHD wide angle camera, the region-of-interest extraction system may perform the role of a related-art wide angle camera with an image that is downsized to the level of HD or lower, and may perform the role of a related-art narrow angle camera with an image from which a region of interest is extracted.

Figure 1A:
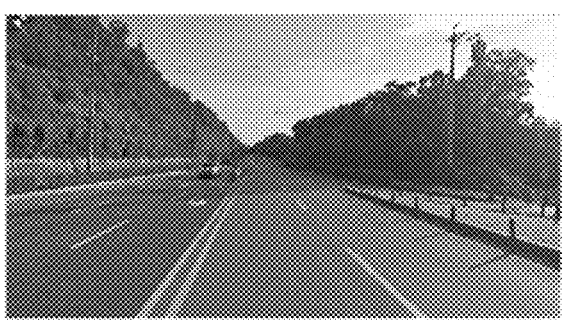
FIGS. 1A to 1C are views provided to explain the influence of downsizing and region-of-interest extraction methods on results of estimating depth regarding a depth estimation problem.
Figure 1B:
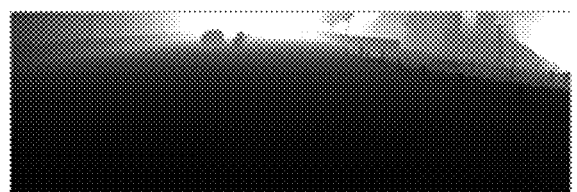
Figure 1C:
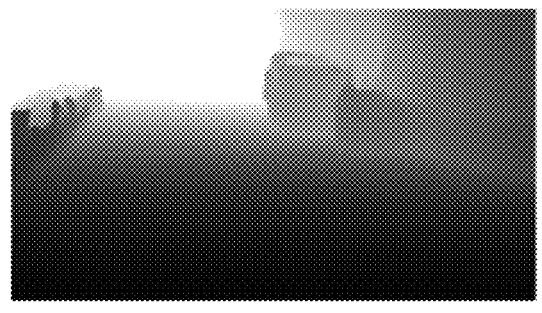
Figure 2A:
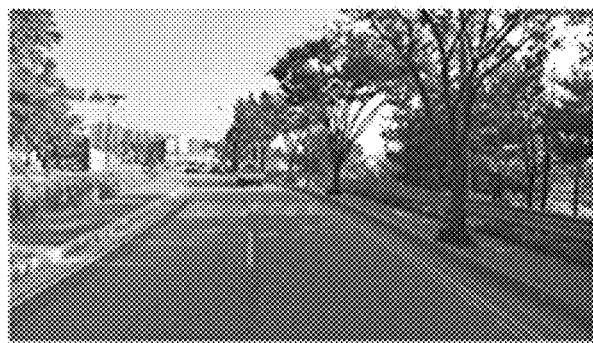
FIGS. 2A to 2D are views provided to explain a problem arising in a related-art technology of extracting a fixed region of interest.
Figure 2B:
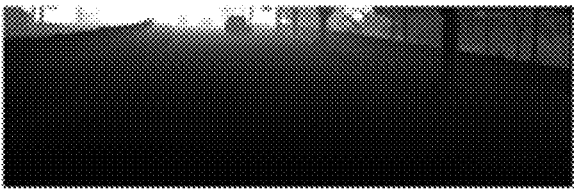
Figure 2C:
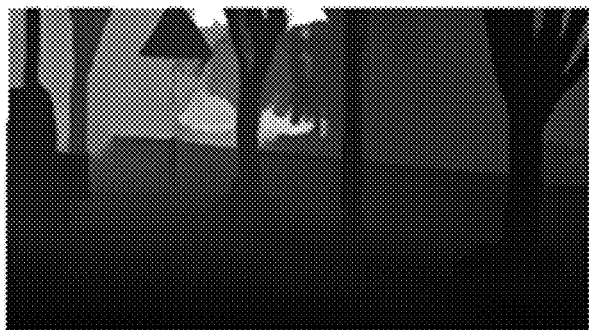
Figure 2D:
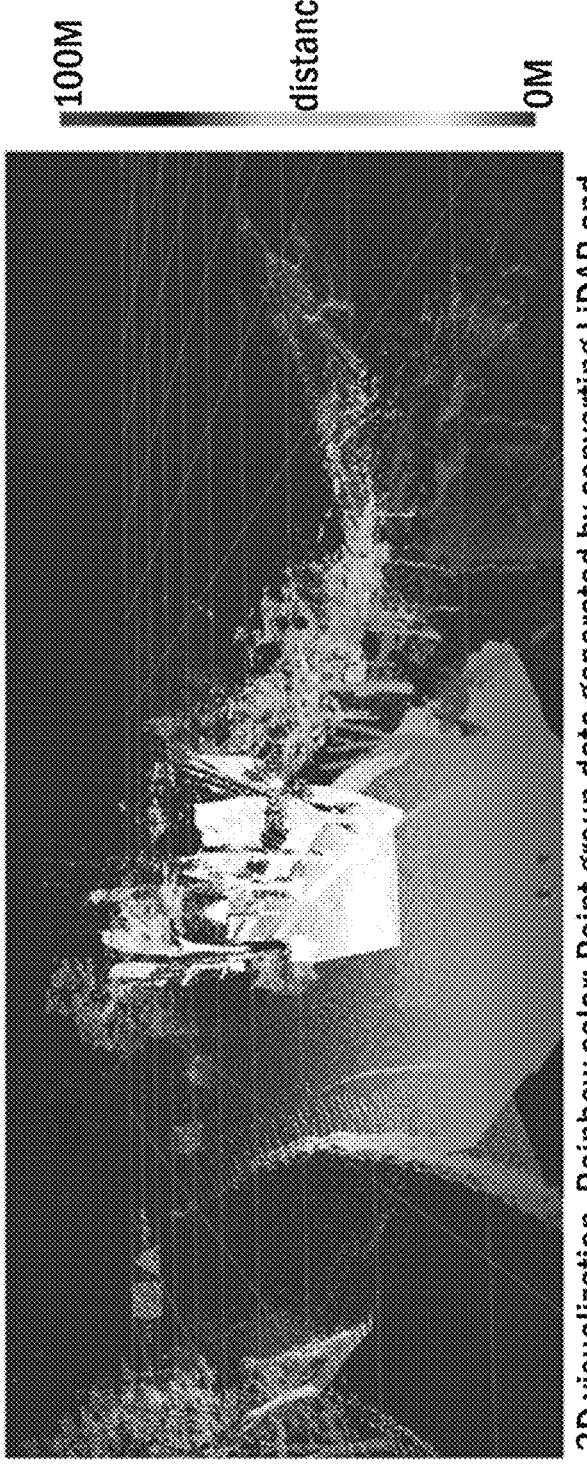
Figure 3A:
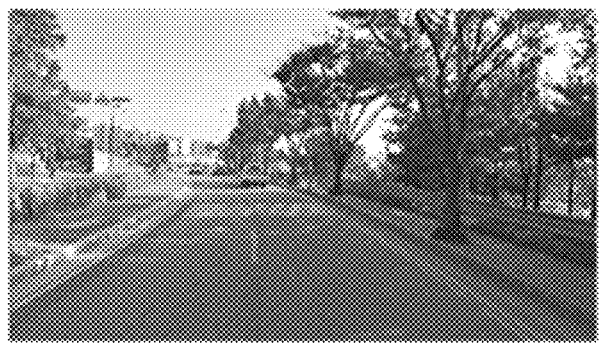
FIGS. 3A to 3D are views illustrating a result of extracting a region of interest by using a system for extracting a region of interest based on a drivable region in a high-resolution camera according to an embodiment of the disclosure.
Figure 3B:
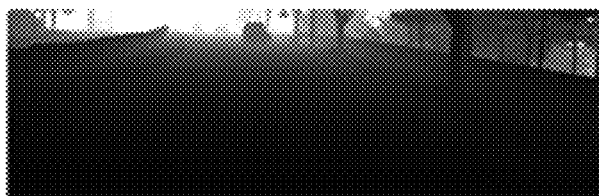
Figure 3C:
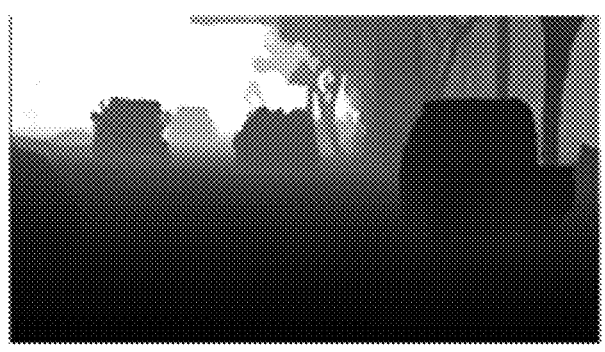

FIGS. 3A to 3D are views illustrating a result of extracting a region of interest while a vehicle is traveling on a curved road according to an embodiment of the disclosure. FIG. 3C illustrates a state in which a region of interest is appropriately extracted when a driver needs to watch a left side of an image, and a vehicle at far distance is additionally detected by performing depth estimation by using the extracted region of interest (compared to FIG. 3B).

Figure 4:
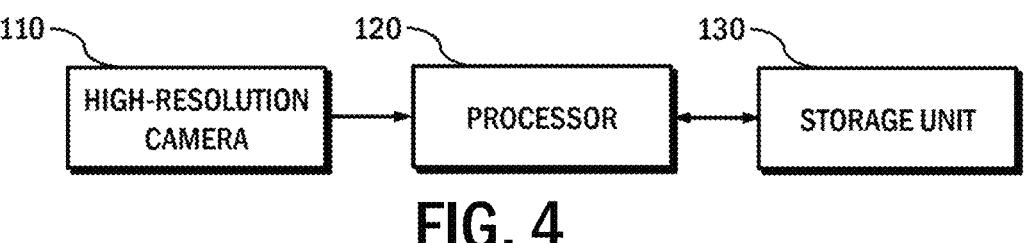
FIG. 4 is a view provided to explain a system for extracting a region of interest based on a drivable region in a high-resolution camera according to an embodiment of the disclosure.

FIG. 4 is a view provided to explain a region-of-interest extraction system according to an embodiment. Referring to FIG. 4, the region-of-interest extraction system according to the present embodiment may include a high-resolution camera 110, a processor 120, and a storage unit 130.

The high-resolution camera 110 may be installed in an autonomous vehicle to acquire a high-resolution image such as a FHD (1020×1080) image or a UHD (3840×2160) image.

The storage unit 130 is a storage medium that stores a program and data necessary for operating the processor 120.

The processor 120 is provided to process overall matters of the region-of-interest extraction system.

For example, the processor 120 may extract a region of interest within an image which is acquired by using 3D drivable region information.

In addition, the processor 120 may generate a near-distance point group and a far-distance point group based on the extracted region of interest.

To achieve this, the processor 120 may include a first processor which extracts a region of interest within an image acquired by using 3D drivable region information, and a second processor which generates a near-distance point group and a far-distance point group based on the extracted region of interest.

Figure 5:
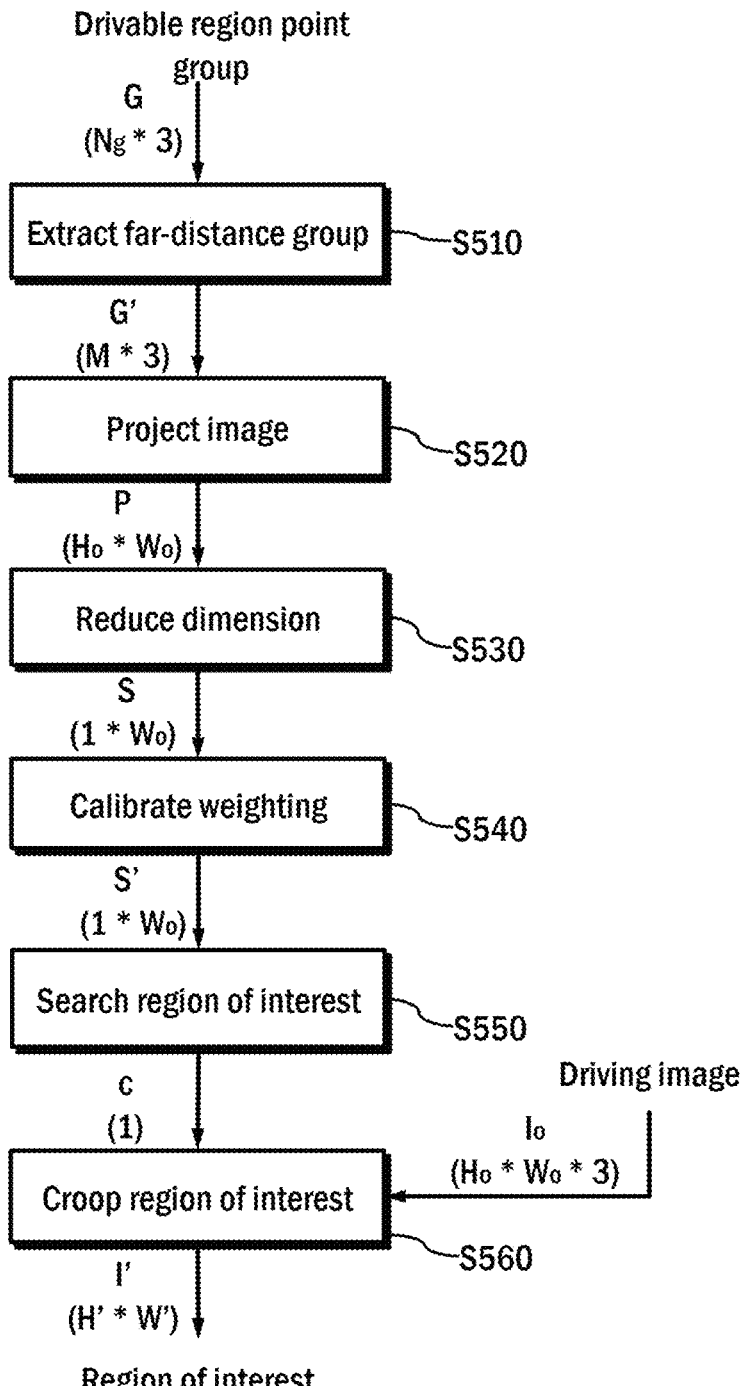
FIG. 5 is a flowchart provided to explain a method for extracting a region of interest based on a drivable region in a high-resolution camera according to an embodiment of the disclosure.

FIG. 5 is a flowchart provided to explain a method for extracting a region of interest based on a drivable region in a high-resolution camera (hereinafter, referred to as a "region-of-interest extraction method") according to an embodiment, and FIG. 6 is a view provided to explain a region-of-interest search algorithm according to an embodiment.

The region-of-interest extraction method according to the present embodiment may be executed by the region-of-interest extraction system described above with reference to FIGS. 3A, 3B, 3C, 3D, and 4.

In particular, a process of extracting a region of interest within an image acquired by using 3D drivable region information may be executed by the first processor of the region-of-interest extraction system.

The first processor requires a 3D drivable region point group ($G \in \mathbb{R}^{N_g \times 3}$) as input data.

In this case, $N_g$ is the number of points in a point group and G is partial point group data which is constituted by extracting only points corresponding to a 'bottom' through binary clarification for each point in 3D point group data obtained through a LiDAR or a pseudo LiDAR installed in a vehicle.

Each point of G may be constituted by 3D points (x, y, z) of camera coordinate system, and the origin is the same as a position of the camera. In addition, an x-axis is oriented toward the right side of the camera, a y-axis is oriented toward the bottom (ground surface) of the camera, and a z-axis is oriented toward the front of the camera.

When a region of interest within an image is extracted and G is presented, the first processor may generate a region of interest ($I' \in \mathbb{R}^{H' \times W'}$) by performing a far-distance point group extraction operation (S510), an image projection operation (S520), a dimension reduction operation (S530), a weighting calibration operation (S540), a region-of-interest search operation (S550), and a region-of-interest extraction (crop) operation (S560) in sequence.

In performing the far-distance point group extraction operation (S510), the first processor may generate a far-distance point group (G') by extracting only points corresponding to a predetermined condition with respect to all points (x, y, z) of partial point group data (G), which is constituted by extracting only points corresponding to a bottom through binary classification for each point in 3D point group data obtained by a LiDAR or a pseudo LiDAR installed in a vehicle.

Specifically, in performing the far-distance point group extraction operation (S510), the first processor may generate a far-distance point group ($G' \in \mathbb{R}^{M \times 3}$) by extracting only points satisfying $d_{min} < z < d_{max}$ with respect to all points (x, y, z) of partial point group data (G).

In this case, $d_{min}$ and $d_{max}$ refer to a minimum distance value ($d_{min}$) and a maximum distance value ($d_{max}$) in the forward direction of the camera, respectively.

In addition, in performing the image projection operation (S520), the first processor may project all points (x, y, z) of the far-distance point group (G') to 2D original image pixels (u, v).

Specifically, in performing the image projection operation (S520), when all points (x, y, z) of the far-distance point group (G') is projected to the 2D original image pixels (u, v)

by using an image projection equation ($[u, v, 1]^T = K \times [R|T] \times [x, y, z, 1]^T$), the first processor may generate a binary image ($P \in \mathbb{R}^{H_o \times W_o}$) by representing pixels to which points of the far-distance point group (G') are projected by 1, and representing pixels to which points of the far-distance point group (G') are not projected by 0.

Herein, $H_o$ refers to the number of vertical pixels of an original image, and $W_o$ refers to the number of horizontal pixels of the original image.

K, R, T refer to a camera feature matrix, a rotation matrix, and a motion vector, respectively, and may be obtained through calibration.

In addition, in performing the dimension reduction operation (S530), the first processor may generate a one-dimensional feature point map ($S \in \mathbb{R}^{1 \times W_o}$) by adding a pixel value to a vertical axis.

Herein, the one-dimensional feature point map ($S \in \mathbb{R}^{1 \times W_o}$) may have a relatively larger value as more far-distance drivable region points are included.

In addition, in performing the weighting calibration operation (S540), the first processor may acquire a new feature point map (S') in which a weighting is calibrated, by multiplying the feature point map (S) by the Gaussian distribution.

In this case, on the new feature point map (S') in which the weighting is calibrated, the weighting is applied to the $W_{o/2}$-th pixel which is an image horizontal center point when an average of the Gaussian distribution is $W_{o/2}$ and a standard deviation is $\sigma^2$, so that, when a region of interest is searched, the probability of selecting the image horizontal center point increases, and thus, the proximity of the image horizontal center point is selected unless an obstacle is positioned close to the image horizontal center point.

In addition, in performing the region-of-interest search operation (S550), the first processor may search a peripheral region with reference to a predetermined region-of-interest center point initial value by using a region-of-interest search algorithm (applying the gradient descent).

Herein, the region-of-interest search algorithm may be algorithm 1 that receive the feature point map (S'), a horizontal length of the region of interest (W'), and the region-of-interest center point initial value (C0) as input, and outputs the center point (C) of the region of interest.

Specifically, in performing the region-of-interest search operation (S550), the first processor may search a peripheral region with reference to the region-of-interest center point initial value (C0) a predetermined number of times.

In this case, the peripheral region that is searched with reference to the region-of-interest center point initial value may have a vertical size of H', a horizontal size of W', and a center point horizontal coordinate of C.

The center point horizontal coordinate C may be stored in a memory of the storage unit 130 and may be used as a region-of-interest center point initial value C0 when a region of interest is searched in the next frame.

In performing the region-of-interest extraction operation (S560), the first processor may generate a region-of-interest image by extracting a region that satisfies a predetermined condition from the input image.

Specifically, in performing the region-of-interest extraction operation (S560), the first processor may generate a region-of-interest image by extracting a region that satisfies a predetermined first condition and a predetermined second condition.

Herein, the predetermined first condition is $c-W'/2 < x < c + W'/2$, and the predetermined second condition is $H_o/2 - H'/2 < y < H_o/2 + H'/2$, where $H_o$ is the number of vertical pixels of an original image, W' is a horizontal size of a searched peripheral region, H' is a vertical size of the searched peripheral region, C is a horizontal coordinate of the center point, and (x, y) is pixel coordinates of an input image.

The region of interest (the region-of-interest image) extracted by the first processor is a region that includes the most far-distance drivable regions among region-of-interest candidates extractable from the whole image.

Figure 7:
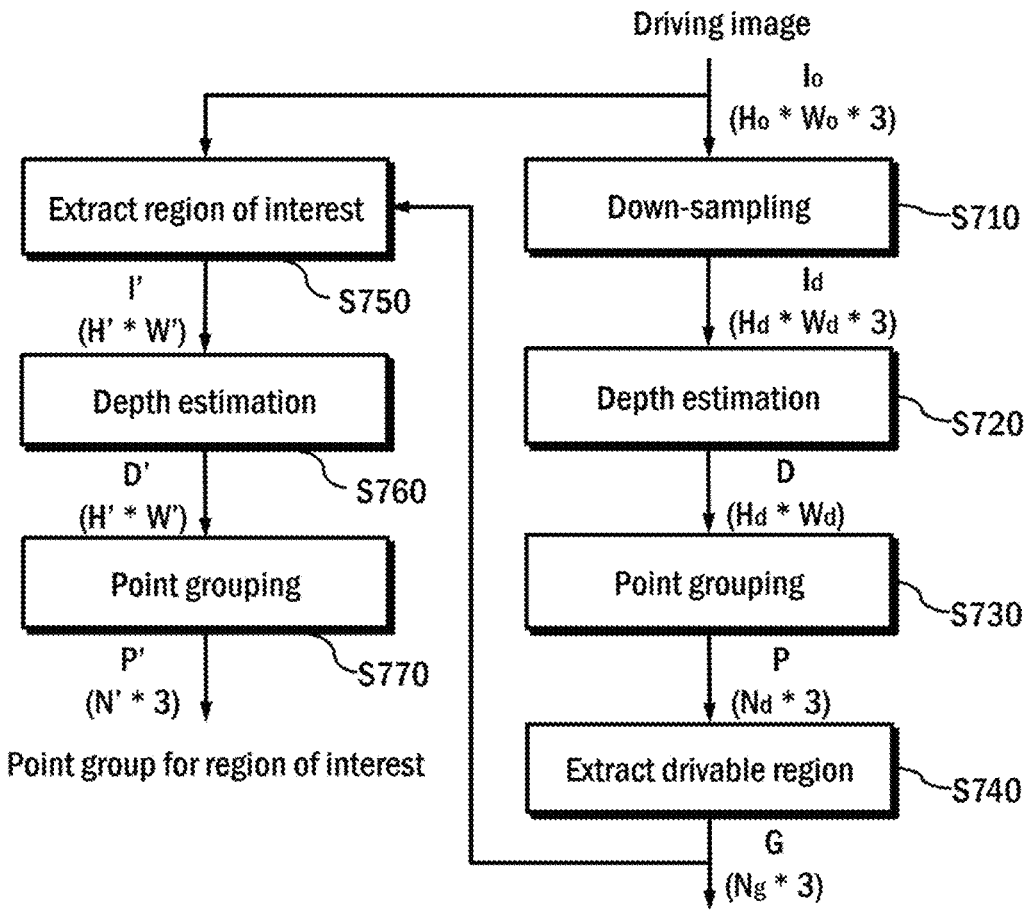
FIG. 7 is a flowchart provided to explain a method for generating a near-distance point group and a far-distance point group, based on a region of interest extracted by using a method for extracting a region of interest based on a drivable region in a high-resolution camera according to an embodiment of the disclosure.

FIG. 7 is a flowchart provided to explain a method for generating a near-distance point group and a far-distance point group based on a region of interest which is extracted by the region-of-interest extraction method according to an embodiment.

The method for generating the near-distance point group and the far-distance point group based on the extracted region of interest may be executed by the second processor of the region-of-interest extraction system.

The second processor may generate a near-distance point group (a point group regarding a downsized image) and a far-distance point group (a point group regarding a region of interest), simultaneously, by using the region of interest extracted by the first processor in estimating a far-distance depth map.

To achieve this, the second processor may perform a down-sampling operation (S710), a primary depth estimation operation (S720), a primary point grouping operation (S730), a drivable region extraction operation (S740), a region-of-interest extraction operation (S750), a secondary depth estimation operation (S760), and a second art point grouping operation (S770) in sequence.

Specifically, in performing the down-sampling operation (S710), the second processor may generate an image ($I_d$) having a resolution of HD or lower by down-sampling a high-resolution input image of FHD or higher. In this case, the generated image ($I_d$) has a low resolution, so that time required to estimate depth may be reduced.

In performing the primary depth estimation operation (S720), the second processor may perform depth estimation based on a neural network by using $I_d$, and may generate a depth map D based on the result of depth estimation. Herein, the generated depth map D has the same horizontal and vertical sizes as $I_d$ and each pixel may have a meter-based distance value.

In performing the primary point grouping operation (S730), the second processor may change the depth map D to a point group P having $N_d = H_d * W_d$ 3D points through a typical point grouping method.

Herein, since the generated near-distance point group P is generated from a downsized image, a maximum detectable distance may be shorter than when a point group is generated from an original image.

In performing the drivable region extraction operation (S740), the second processor may generate a partial point group G that is constituted by $N_g$ points by extracting only points corresponding to a drivable region by extracting the drivable region from the generated point group P.

In performing the region-of-interest extraction operation (S750), the second processor may extract a region of interest I' (a low resolution of VGA or lower) by using $I_o$ and G.

In performing the secondary depth estimation operation (S760) and the secondary point grouping operation (S770), the second processor may generate a point group P' regarding the region of interest by performing the same depth estimation operation and point grouping operation as for $I_d$ for I'.

Herein, the generated P' may have N'=H'*W' 3D points. In addition, since P' is not downsized, farther-distance points may be detected from P' compared to P.

Figure 3D:

Herein, the generated P and P' are illustrated in FIG. 3D by rainbow color and white color.

P and P' may be used as pseudo LiDAR data for 3D object recognition, instead of a point group obtained by LiDAR.

Accordingly, the region-of-interest extraction system according to the disclosure may enhance far-distance information extraction performance by extracting an appropriate region of interest, and may reduce a production cost by reducing the number of sensors.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A method for extracting a region of interest for vehicle perception and control based on a drivable region in a high-resolution camera, the method comprising:

acquiring an image through the high-resolution camera mounted on a vehicle; and extracting, by a processor operatively coupled to a vehicle-mounted perception processor, a region of interest within the acquired image by using 3D drivable region information generated from a LiDAR or pseudo-LiDAR sensor configured to measure a road surface, wherein the extracted region of interest is utilized to generate perception data for autonomous-driving path planning and control, wherein the extracting the region of interest within the image comprises:

generating a far-distance point group (G') by extracting only points corresponding to a predetermined condition with respect to all points (x, y, z) of partial point-group data (G);

projecting all points (x, y, z) of the far-distance point group (G') to 2D original-image pixels (u, v);

generating an 1D feature-point map ($S \in \mathbb{R}^{1 \times W_o}$) by adding a pixel value to a vertical axis;

acquiring a new feature-point map (S') in which a weighting is calibrated by multiplying the feature-point map (S) by a Gaussian distribution; and searching a peripheral region with reference to a predetermined region-of-interest center-point initial value by using a region-of-interest search algorithm, and wherein the region of interest determined in a current frame is used to predict a drivable area in a subsequent frame, thereby maintaining temporal continuity and reducing computational load.

2. The method of claim 1, wherein the partial point group data being constituted by extracting only points corresponding to a bottom through binary classification for each point in 3D point group data acquired by a LiDAR or a pseudo LiDAR installed in a vehicle, and the extracting the region of interest within the image further comprises generating a region-of-interest image by extracting a region that satisfies a predetermined condition from an input image.

3. The method of claim 2, wherein the generating the far-distance point group (G') comprises generating the far-distance point group ($G' \in \mathbb{R}^{M \times 3}$) by extracting only points satisfying $d_{min} < z < d_{max}$ with respect to all points (x, y, z) of the partial point group data (G), and wherein $d_{min}$ and $d_{max}$ refer to a minimum distance value ($d_{min}$) and a maximum distance value ($d_{max}$) in a forward direction of the camera, respectively.

4. The method of claim 2, wherein the projecting all points (x, y, z) comprises, when all points (x, y, z) of the far-distance point group (G') are projected to the 2D original image pixels (u, v) by using an image projection equation ($[u, v, 1]^T = K \times [R|T] \times [x, y, z, 1]^T$), generating a binary image ($P \in \mathbb{R}^{H_o \times W_o}$) by representing pixels to which specific points of the far-distance point group (G') are projected by 1, and representing pixels to which specific points of the far-distance point (G') are not projected by 0, and wherein $H_o$ refers to a number of vertical pixels of the original image, and $W_o$ refers to a number of horizontal pixels of the original image.

5. The method of claim 2, wherein the 1D feature point map ($S \in \mathbb{R}^{1 \times W_o}$) has a larger value as more far-distance drivable region points are included.

6. The method of claim 5, wherein, on the new feature point map (S') in which the weighting is calibrated, the weighting is applied to a $W_{o/2}$-th pixel which is an image horizontal center point when an average of the Gaussian distribution is $W_{o/2}$ and a standard deviation is $\sigma^2$, so that, when a region of interest is searched, the probability of selecting the image horizontal center point increases, and the proximity of the image horizontal center point is selected unless an obstacle is positioned close to the image horizontal center point.

7. The method of claim 2, wherein the searching the peripheral region comprises searching a peripheral region with reference to a region-of-interest center point initial value C0 a predetermined number of times, wherein the peripheral region searched with reference to the region-of-interest center point initial value has a vertical size of H', a horizontal size of W', and a center point horizontal coordinate of C, and wherein the center point horizontal coordinate C is used as a region-of-interest center point initial value C0 when a region of interest is searched in a next frame.

8. The method of claim 7, wherein the generating the region-of-interest image comprises generating a region-of-interest image by extracting a region that satisfies a predetermined first condition and a predetermined second condition, wherein the predetermined first condition is $c - W'/2 < x < c + W'/2$, and the predetermined second condition is $H_o/2 - H'/2 < y < H_o/2 + H'/2$, where $H_o$ is a number of vertical pixels of the original image, W' is a horizontal size of the searched peripheral region, H' is a vertical size of the searched peripheral region, C is a center point horizontal coordinate, and (x, y) is pixel coordinates of an input image.

9. The method of claim 1, further comprising generating, by the processor, a near-distance point group and a far-distance point group based on the extracted region of interest.

10. A system for extracting a region of interest for vehicle perception and control based on a drivable region in a high-resolution camera, the system comprising:

a high-resolution camera; and a processor configured to extract a region of interest within an image acquired through the high-resolution camera, mounted on a vehicle, by using 3D drivable region information generated from a LiDAR or pseudo-LiDAR sensor configured to measure a road surface, wherein the extracted region of interest is utilized to generate perception data for autonomous-driving path planning and control, wherein, for the extracting the region of interest within the image, the processor is configured to:

generate a far-distance point group (G') by extracting only points corresponding to a predetermined condition with respect to all points (x, y, z) of partial point-group data (G);

project all points (x, y, z) of the far-distance point group (G') to 2D original-image pixels (u, v);

generate an 1D feature-point map ($S \in \mathbb{R}^{1 \times W_o}$) by adding a pixel value to a vertical axis;

acquire a new feature-point map (S') in which a weighting is calibrated by multiplying the feature-point map (S) by a Gaussian distribution; and search a peripheral region with reference to a predetermined region-of-interest center-point initial value by using a region-of-interest search algorithm, and wherein the region of interest determined in a current frame is used to predict a drivable area in a subsequent frame, thereby maintaining temporal continuity and reducing computational load.

11. A method for extracting a region of interest based on a drivable region in a high-resolution camera, for use in an autonomous-vehicle perception and control pipeline, the method comprising:

extracting, by a first processor, a region of interest within an image by using 3D drivable region information obtained from a LiDAR or pseudo-LiDAR sensor mounted on a vehicle and calibrated to the camera; and generating, by a second processor, a near-distance point group and a far-distance point group based on the extracted region of interest, wherein the first processor projects 3D drivable-region points to 2D image pixels according to an extrinsic calibration between the LiDAR and the camera, generates a feature-point map, applies weighting emphasizing a central drivable area, and determines the region of interest via iterative peripheral search so as to maintain temporal continuity across consecutive frames and reduce computational load, and wherein the second processor outputs the near-distance and far-distance point groups to an autonomous-driving controller for path planning or obstacle-avoidance processing.

12. A system for extracting a region of interest based on a drivable region in a high-resolution camera, for integration with an autonomous-driving controller, the system comprising:

a first processor configured to extract a region of interest within an image by using 3D drivable region information derived from a LiDAR or pseudo-LiDAR sensor mounted on a vehicle and extrinsically calibrated to the camera; and a second processor configured to generate a near-distance point group and a far-distance point group based on the extracted region of interest, wherein the first processor is further configured to project 3D points to image pixels, construct a feature-point map, apply weighting centered at an image-horizontal center corresponding to a drivable-area centerline, and determine the region of interest by iteratively searching a peripheral area to preserve inter-frame consistency, and wherein the second processor provides the generated point groups and the region-of-interest data to an autonomous-driving control module for use in lane-boundary estimation and obstacle detection.

13. The system of claim 12, wherein, for the step of extracting the region of interest within the image, the first processor is further configured to:

generate a far-distance point group (G') by extracting only points corresponding to a predetermined condition with respect to all points (x, y, z) of partial point group data (G), the partial point group data being constituted by extracting only points corresponding to a bottom through binary classification for each point in 3D point group data acquired by a LiDAR or a pseudo LiDAR installed in a vehicle;

project all points (x, y, z) of the far-distance point group (G') to 2D original image pixels (u, v);

generate an 1D feature point map ($S \in \mathbb{R}^{1 \times W_o}$) by adding a pixel value to a vertical axis;

acquire a new feature point map (S') in which a weighting is calibrated by multiplying the feature point map (S) by the Gaussian distribution;

search a peripheral region with reference to a predetermined region-of-interest center point initial value by using a region-of-interest search algorithm; and generate a region-of-interest image by extracting a region that satisfies a predetermined condition from an input image.

14. The system of claim 13, wherein, for the generating the far-distance point group (G'), the first processor is further configured to generate the far-distance point group ($G' \in \mathbb{R}^{M \times 3}$) by extracting only points satisfying $d_{min} < z < d_{max}$ with respect to all points (x, y, z) of the partial point group data (G), and wherein $d_{min}$ and $d_{max}$ refer to a minimum distance value ($d_{min}$) and a maximum distance value ($d_{max}$) in a forward direction of the camera, respectively.

15. The system of claim 13, wherein, for the projecting all points (x, y, z), the first processor is further configured to, when all points (x, y, z) of the far-distance point group (G') are projected to the 2D original image pixels (u, v) by using an image projection equation ($[u, v, 1]^T = K \times [R|T] \times [x, y, z, 1]^T$), generate a binary image ($P \in \mathbb{R}^{H_o \times W_o}$) by representing pixels to which specific points of the far-distance point group (G') are projected by 1, and represent pixels to which specific points of the far-distance point (G') are not projected by 0, and wherein $H_o$ refers to a number of vertical pixels of the original image, and $W_o$ refers to a number of horizontal pixels of the original image.

16. The system of claim 13, wherein the 1D feature point map ($S \in \mathbb{R}^{1 \times W_o}$) has a larger value as more far-distance drivable region points are included.

17. The system of claim 16, wherein, on the new feature point map (S') in which the weighting is calibrated, the weighting is applied to a $W_{o/2}$-th pixel which is an image horizontal center point when an average of the Gaussian distribution is $W_{o/2}$ and a standard deviation is $\sigma^2$, so that, when a region of interest is searched, the probability of selecting the image horizontal center point increases, and the proximity of the image horizontal center point is selected unless an obstacle is positioned close to the image horizontal center point.

18. The system of claim 13, wherein, for the searching the peripheral region, the first processor is further configured to search a peripheral region with reference to a region-of-interest center point initial value C0 a predetermined number of times, wherein the peripheral region searched with reference to the region-of-interest center point initial value has a vertical size of H', a horizontal size of W', and a center point horizontal coordinate of C, and wherein the center point horizontal coordinate C is used as a region-of-interest center point initial value C0 when a region of interest is searched in a next frame.

19. The system of claim 18, wherein, for the generating the region-of-interest image, the first processor is further configured to generate a region-of-interest image by extracting a region that satisfies a predetermined first condition and a predetermined second condition, wherein the predetermined first condition is $c-W'/2 < x < c + W'/2$, and the predetermined second condition is $H_o/2 - H'/2 < y < H_o/2 + H'/2$, where $H_o$ is a number of vertical pixels of the original image, W' is a horizontal size of the searched peripheral region, H' is a vertical size of the searched peripheral region, C is a center point horizontal coordinate, and (x, y) is pixel coordinates of an input image.

20. The system of claim 12, wherein the second processor is further configured to generate a near-distance point group and a far-distance point group based on the extracted region of interest.

* * * * *